(12) United States Patent
Laukkanen et al.

(10) Patent No.: US 9,534,320 B2
(45) Date of Patent: Jan. 3, 2017

(54) METHOD FOR FABRICATING FIBER PRODUCTS AND COMPOSITES

(75) Inventors: Antti Laukkanen, Helsinki (FI); Jan-Erik Teirfolk, Turku (FI); Markus Samuli Nuopponen, Helsinki (FI); Andreas Walther, Köln (DE); Olli Ikkala, Helsinki (FI)

(73) Assignee: UPM-KYMMENE CORPORATION, Helsinki (FI)

(*) Notice: Subject to any disclaimer, the term of this patent is extended or adjusted under 35 U.S.C. 154(b) by 274 days.

(21) Appl. No.: 13/984,673

(22) PCT Filed: Feb. 8, 2012

(86) PCT No.: PCT/FI2012/050121
§ 371 (c)(1),
(2), (4) Date: Oct. 28, 2013

(87) PCT Pub. No.: WO2012/107643
PCT Pub. Date: Aug. 16, 2012

(65) Prior Publication Data
US 2014/0058077 A1    Feb. 27, 2014

(30) Foreign Application Priority Data

Feb. 10, 2011  (FI) ..................... 20115131
Feb. 14, 2011  (FI) ..................... 20115137

(51) Int. Cl.
| | | |
|---|---|---|
| C08J 5/06 | (2006.01) | |
| C12P 19/04 | (2006.01) | |
| D01F 2/00 | (2006.01) | |
| B82Y 30/00 | (2011.01) | |
| C08J 5/00 | (2006.01) | |
| C08J 5/04 | (2006.01) | |
| C08J 5/24 | (2006.01) | |
| C08L 1/02 | (2006.01) | |
| D01D 5/06 | (2006.01) | |
| D21C 5/02 | (2006.01) | |
| D21H 11/14 | (2006.01) | |
| D21H 27/10 | (2006.01) | |

(52) U.S. Cl.
CPC ............... D01F 2/00 (2013.01); B82Y 30/00 (2013.01); C08J 5/005 (2013.01); C08J 5/045 (2013.01); C08J 5/24 (2013.01); C08L 1/02 (2013.01); D01D 5/06 (2013.01); D21C 5/02 (2013.01); D21H 11/14 (2013.01); D21H 27/10 (2013.01); C08L 2205/16 (2013.01); Y02W 30/648 (2015.05)

(58) Field of Classification Search
CPC ..................... C08J 5/06; C12P 19/04
USPC ................. 536/76, 124
See application file for complete search history.

(56) References Cited

U.S. PATENT DOCUMENTS 6,190,501 B1    2/2001  Tanaka et al.

FOREIGN PATENT DOCUMENTS

| | | | |
|---|---|---|---|
| CN | 101172164 A | * 5/2008 | ............. A61L 15/28 |
| EP | 1 769 836 A1 | 4/2007 | |
| JP | 3653543 B2 | 5/2005 | |
| JP | 2006-042795 A | 2/2006 | |
| JP | 2006-241450 A | 9/2006 | |
| JP | A-2010-90486 | 4/2010 | |
| JP | A-2010-242063 | 10/2010 | |
| WO | WO 2008/121069 A1 | 10/2008 | |
| WO | WO 2009/084566 A1 | 7/2009 | |
| WO | WO 2010/001829 A1 | 1/2010 | |
| WO | 2010/043889 A1 | 4/2010 | |
| WO | WO 2010/043889 A1 | 4/2010 | |
| WO | WO 2010/092239 A1 | 8/2010 | |
| WO | WO 2010/134357 A1 | 11/2010 | |
| WO | WO 2010/142845 A1 | 12/2010 | |

OTHER PUBLICATIONS

Han et al (CN 101172164 A, dated May 2008, English Language Translated Copy).*
Han et al (CN 101172164 A, dated May 2008, Derwent Abstract).*
Iwamoto et al., "Structure and Mechanical Properties of Wet-Spun Fibers Made from Natural Cellulose Nanofibers," *Biomacromolecules*, 2011, pp. 831-836, vol. 12.
Capadona et al., "A versatile approach for the processing of polymer nanocomposites with self-assembled nanofibre templates," *Nature Nanotechnology*, 2007, pp. 765-769, vol. 2.

(Continued)

*Primary Examiner* — Sudhakar Katakam
*Assistant Examiner* — Everett White
(74) *Attorney, Agent, or Firm* — Nixon Peabody LLP; Leena H. Karttunen Contarino; Elizabeth Baio (57) ABSTRACT

Method for fabricating fiber and film products and composites includes: introducing an aqueous gel of nanofibrillar cellulose into a volume of organic extraction agent miscible with water so that the aqueous gel is kept as a separate phase and forms one or several discrete physical entities containing the nanofibrillar cellulose within the phase; changing water with the organic extraction agent in said one or several discrete physical entities of nanofibrillar cellulose; and drying the nanofibrillar cellulose by removing the organic extraction agent from the one or several discrete physical entities of nanofibrillar cellulose. In the method the aqueous gel of nanofibrillar cellulose is introduced into the volume of organic extraction agent in the form of one or several elongated elements which form a fiber-like or ribbon-like or film-like product after drying.

29 Claims, 5 Drawing Sheets

(56) References Cited

OTHER PUBLICATIONS

Capadona et al., "A versatile approach for the processing of polymer nanocomposites with self-assembled nanofiber templates (supplementary information)," Nov. 25, 2007, retrieved from the Internet: http://www.nature.com/nnano/jounal/v2/n12/extref/nnano.2007.379-s1.pdf.
Fratzl et al., "Nature's hierarchical materials," *Progress in Materials Science*, 2007, pp. 1263-1334, vol. 52.
Meyers et al., "Biological materials: Structure and mechanical properties," *Progress in Materials Science*, 2008, pp. 1-206, vol. 53.
Siró et al., "Microfibrillated cellulose and new nanocomposite materials: a review," *Cellulose*, 2010, pp. 459-494, vol. 17.
Eichhorn et al., "Review: current international research into cellulose nanofibres and nanocomposites," *J Mater Sci*, 2010, pp. 1-33, vol. 45.
Iwamoto et al., "Elastic Modulus of Single Cellulose Microfibrils from Tunicate Measured by Atomic Force Microscopy," *Biomacromolecules*, 2009, pp. 2571-2576, vol. 10.
Yano et al., "Optically Transparent Composites Reinforced with Networks of Bacterial Nanotibers**," *Advanced Materials*, 2005, pp. 153-155, vol. 17(2).
Jin et al., "Nanofibrillar cellulose aerogels," *Colloids and Surfaces A: Physicochem. Eng. Aspects*, 2004, pp. 63-67, vol. 240.
International Search Report issued in International Application No. PCT/FI2012/050121 dated Sep. 4, 2012.
Apr. 5, 2016 Office Action issued in Japanese Patent Application No. 2013-552996.

* cited by examiner

METHOD FOR FABRICATING FIBER PRODUCTS AND COMPOSITES

FIELD OF THE INVENTION

The present invention relates to a method for fabricating dried cellulose products, fiber products and composites. The invention also relates to novel fiber products and composites.

BACKGROUND OF THE INVENTION

Fibrous architectures are among the most abundant load-carrying materials in nature. This structural motif bridges the length scales from the smallest peptide folding motifs to protein materials as in collagen up to larger structural entities like spider silk or cellulose microfibrils (P. Fratzl, R. Weinkamer, Prog. Mater. Sci. 2007, 52, 1263; M. A. Meyers, P. Y. Chen, A. Y. M. Lin, Y. Seki, Prog. Mater. Sci. 2008, 53, 1) The latter are composed of highly aligned native crystalline β-D-(1-4)glucopyranose polysaccharide chains (cellulose I crystals) where the chains are strongly intermolecularly bound via a multitude of hydrogen bonds. These microfibrils are the main building blocks of plants and are responsible for the mechanical strength of wood or nutshells. Their underlying native nanocellulose fibrils (also known as nanofibrillated cellulose (NFC) or microfibrillated cellulose (MFC)) can be isolated via consecutive chemical/enzymatic and homogenization treatments (I. Siro, D. Plackett, Cellulose 2010, 17, 459; S. J. Eichhorn, A. Dufresne, M. Aranguren, N. E. Marcovich, J. R. Capadona, S. J. Rowan, C. Weder, W. Thielemans, M. Roman, S. Renneckar, W. Gindl, S. Veigel, J. Keckes, H. Yano, K. Abe, M. Nogi, A. N. Nakagaito, A. Mangalam, J. Simonsen, A. S. Benight, A. Bismarck, L. A. Berglund, T. Peijs, J. Mater. Sci. 2010, 45, 1.) They typically consist of highly crystalline nanoscale fibrils with diameters around 1-35 nm and several micrometers in length. Cellulose nanocrystals, alternatively called as nanowhiskers, are related materials, which are shorter and rod-like due to strong acid hydrolysis. Nanofibrillated cellulose is a remarkable emerging class of nature-derived nanomaterial for its extraordinary mechanical properties, combining astonishing stiffness and expected strength with a lightweight character. It has been shown earlier that cellulose I crystals can reach a Young's modulus of up to 136 GPa and an expected strength in the range of a few GPa (S. Iwamoto, W. H. Kai, A. Isogai, T. Iwata, Biomacromolecules 2009, 10, 2571; H. Yano, J. Sugiyama, A. N. Nakagaito, M. Nogi, T. Matsuura, M. Hikita, K. Handa, Adv. Mater. 2005, 17, 153) These properties rank them at the top end of high-performance natural materials. As a comparison, the stiffness of cellulose I is two to three times higher than that for glass fibers (50-80 GPa), just above typical titanium alloys (105-120 GPa) and it approaches that of steel (200 GPa). Strikingly, all of this is realized by a purely organic material with a comparably low density (ca. 1.6 g/mL). This renders cellulose nanofibrils one of the most promising building blocks for future materials.

Furthermore, NFC is based on a natural polymer that is abundant in nature and is renewable and degradable. Therefore, nanofibrillar cellulose might be an interesting constituent in structures where strength is needed.

Individual cellulose polymers have a long history in the context of fiber production. Fibers based on dissolved and regenerated or fully hydrolyzed cellulose and its derivatives (e.g Rayon™) are widely used for textiles or reinforcements, owing to decades of development. However, due to their inherent strength, as originating from the crystalline character, as not preserved in dissolution processes, NFC based materials possess the potential to go significantly beyond the mechanical performance of molecular cellulose materials.

Thus, numerous trials have been made on trying to achieve nanocomposites based on NFC and synthetic engineering plastics. The reported experiments have shown properties lower than desired, especially with hydrophobic thermoplastics, which would be the most important matrix polymers. The main reason for that is the difficult nature of the NFC: water is needed to fully disperse pristine NFC in the nanoscale. If the water is removed during the compounding stage, the fibers aggregate and phase separation takes place, which will lead to poor mechanical properties.

NFC production techniques are based on grinding (or homogenization) of aqueous dispersion of pulp fibers possibly combined with chemical/biochemical treatments. The concentration of NFC in dispersions is typically very low, usually around 1-5%. After the grinding process, the obtained NFC material is a dilute viscoelastic hydrogel. At very small concentrations, the NFC material in water forms a viscous fluid.

Thus, there is an evident need for transforming the aqueous NFC raw material to a structure where the water is essentially absent and the nanocellulose fibrils are arranged so that they can be used as structural parts in composites or as fiber-like structures of high strength.

In order that the NFC can be used as various structural constituents, water must be removed from the NFC hydrogel. The fundamental problem in mechanical water removal is the high hygroscopicity of NFC and the ability of NFC hydrogel to form a very dense and impermeable nanoscale membrane around itself, for example during filtration. The formed membrane hinders the diffusion of water from the gel structure, which leads to very slow water removal rates. However, water removal is not the only problem, but the nanocellulose fibrils must be arranged in a structure where their strength potential can be fully utilized. Whenever water is removed, the nanocellulose fibrils tend to aggregate which results in poor mechanical properties of the product.

The article Capadona J. R. et al. A versatile approach for the processing of polymer nanocomposites with self-assembled nanofiber templates, Nature Nanotech. 2, 765-769 (2007) describes gels made of nano-scale cellulose whiskers which are obtained through acid hydrolysis of tunicate mantles. The whiskers exist initially in aqueous dispersion and they are made to an organogel in a sol-gel process through extraction agent exchange with a water-miscible extraction agent, whereafter the gel is filled with a matrix polymer by immersing the gel in a solution of the polymer and dried. During the gel-forming step acetone was introduced on top of the aqueous whisker dispersion without mixing the layers. The acetone was exchanged daily and the acetone layer was gently agitated to promote the extraction agent exchange. After some days the acetone organogel, called a "scaffold" was obtained. The article also reports the use of acetonitrile, ethanol, methanol, isopropanol and tetrahydrofuran as extraction agents for making the organogel. The gelled nanofiber scaffold was impregnated with a polymer by immersion in a polymer solution, and the nanocomposite was dried and compacted. Using this approach, nanocomposites with polybutadiene and polystyrene could be fabricated with improved mechanical properties. However, the gel forming step through the extraction agent exchange takes typically many days. No essentially pure NFC fiber products were presented and foreseen, and materials were blends with low weight fraction of NFC which prohibited to achieve high mechanical properties.

SUMMARY OF THE INVENTION

It is a purpose of the invention to provide a new method for the production of fiber products and composites which is both fast, applicable in industrial scale, and brings about a product where the nanocellulose fibrils are mixed arranged in a desired degree with other constituents of the product and/or the nanocellulose fibrils are arranged so that the product has mechanical properties which can be attributed to the excellent mechanical properties of the NFC itself.

It has now been found that water can be extracted from NFC hydrogels using a water-miscible liquid, e.g. ethanol as an extraction agent by a practical method which reduces the drying time and makes it possible to manufacture a variety of products starting from the NFC hydrogel.

Simultaneously with drying, a NFC product is obtained which is in the form of fiber or film. This fiber or film may contain one or more other constituents mixed with the nanocellulose fibrils in the fiber or film. These constituents are incorporated into the hydrogel, in which case they remain in the fiber or film during the formation, or inside the extraction agent, in which case they will penetrate into the fiber or film while the fiber or film is in contact with the extraction agent. Both alternatives are possible at the same time when the fiber or film is prepared.

Fiber or film is used for making products where the strength properties of the NFC fiber or film, combined with the properties of possibly added constituents can be used. However, the dried NFC product can also be an intermediate product where the NFC is mixed with one or more other constituents. This can be used as a raw material for other manufacturing processes where the NFC will remain in a solid final product. One preferable application is to use the mixture of NFC and the other constituent(s) as a building block which, possibly mixed with other materials, can be used as a masterbatch which brings the NFC and the other constituent(s) in the final product. One particular application is the mixture of NFC with a polymer. This product can be used as a masterbatch for manufacturing polymer composites where the polymer (possibly together with another polymer brought at the manufacturing stage) forms the matrix and the NFC forms the reinforcement. The NFC intermediate product is preferably in other form than fiber or film, for example individual particles of regular or irregular shape.

NFC hydrogel, which may be obtained directly from a manufacturing process, is introduced into a water-miscible liquid (extraction agent) so that it exists within the extraction agent as discrete physical entities. If a fiber product is to be manufactured from the NFC hydrogel, the hydrogel is introduced into the extraction agent initially as continuous elongated "thread"-like objects, either as one individual thread or two or more threads in parallel, whereafter the individual thread or two or more parallel threads can be arranged in a 2D (e.g. a mesh) or 3D pattern. By a proper technique these patterns can be formed already in the extraction agent "in situ".

Alternatively, the hydrogel can be introduced in the water-miscible extraction agent as continuous, wider 2-dimensional object for manufacturing a NFC-product in the form of a film, which has preferably constant thickness.

If the purpose is only to incorporate one or more other constituents in the NFC without creating a fiber or film product, for example for making an intermediate masterbatch product of desired composition, the hydrogel is introduced in the extraction agent in the form of discrete objects of regular or indefinite shape.

Depending on the hydrophobic or hydrophilic nature, i.e. water solubility, of the other constituent to be added, it is included in the extraction agent from where it can penetrate into the NFC, or it is included already in the NFC hydrogel prior to the introduction of the hydrogel into the extraction agent. In the former case the constituent can be hydrophobic, for example a polymer which is soluble in the extraction agent for making a NFC/polymer composite, and in the latter case the constituent is hydrophilic. It is also possible to include one or more constituents through the hydrogel in the structure of the NFC product, and later one or more constituents through the extraction agent volume, provided that the constituent(s) included through the hydrogel do not affect the penetration of the other constituent(s) from the extraction agent volume.

The form of the physical entities depends on the way of supplying the NFC into the extraction agent. With a proper technique, the water in the NFC hydrogels can be completely or partly changed to e.g. ethanol. In the second stage of the process, the extraction agent is removed for example in vacuum and/or elevated temperature (elevated temperature, if used, is a temperature higher than 25° C.), and essentially dry NFC is obtained. The drying can take place also by pressure filtration. The total process time starting from the supply of the hydrogel into the extraction agent and ending in obtaining the dried product after the drying step is of the order of some hours, preferably not longer than two hours.

In a most desired embodiment, the hydrogel is introduced in the organic extraction agent carefully so that it remains coherent and does not become dispersed, that is, a phase boundary of the gel against the extraction agent volume is retained the whole time after the contact of the hydrogel with the extraction agent. Possible ways of introducing the hydrogel into the extraction agent volume to create discrete physical entities include supply through a port, for example through nozzles or a slit, or directly into the extraction agent in larger blocks which are crumbled into smaller entities in the extraction agent volume by agitating.

When the water is completely or partly exchanged with the extraction agent in the extraction agent volume, the physical entities keep their original shapes where the gel was initially supplied to the extraction agent volume or the shapes they assumed after mechanical reduction to smaller size in the extraction volume, but the dimensions may change through shrinking. During this extraction agent exchange process, the NFC nanofibrils contained in the gel are stabilized to a coherent structure, where, however, a certain porosity exists. Due to this porosity the evaporation of the extraction agent or its removal in another way is easy after the physical entities are separated from the extraction agent volume. This porosity also allows the penetration of other constituents from the extraction agent. Other constituents can be introduced also after drying using the residual porosity of the physical entities.

The organic liquid that is used for the extraction agent to exchange with the water of the hydrogel is any liquid that is miscible with water and preferably has moderate polarity. Suitable extraction agents are organic liquids, preferably water-miscible alcohols including but not limited to methanol, ethanol, and isopropanol, as well as dioxane and THF. The exchange of the water with the extraction agent leads to an enforcement of the hydrogen bonds between the NFC fibrils and to mechanical stabilization of the physical entities formed, irrespective of which form they assume in the extraction agents. The concept could also incorporate several extraction baths, to allow addition of several functional molecules. Even if not the most feasible process, the later extraction baths can also use an extraction agent which is different from the extraction agent to which the hydrogel was initially introduced. Water-miscibility is not a precondition for these extraction agents, but the miscibility with the previous extraction agent.

Preferred extraction agent is ethanol, which has low toxicity, low heat of evaporation (904 kJ/kg vs. 2256 kJ/kg for water) and exothermic mixing reaction with water (−777 J/mol at 25° C.) which lowers the energy demand. However, if a hydrophobic polymer is to be incorporated into the NFC from the extraction agent volume, the choice of the extraction agent may be dependent on the polymer because the polymer must be soluble in the extraction agent.

During the introduction of the hydrogel into the extraction agent, the stirring or agitation, if used, must be carefully applied to avoid the dispersion of the NFC hydrogel into the extraction agent so that the hydrogel is maintained as discrete physical entities.

According to one embodiment of the invention, the physical entities obtained are elongated fiber-like structures, threads or filaments, which can be post-treated for example for dimensional stability. Post-treatment can be covalent cross-linking and/or protective coating. These threads or filaments can contain, mixed with the NFC, one or more constituents which provide some functionality, such as antibacterial agents and/or dyes. The threads or filaments obtained are fiber products which form in their final application a constructional part affording strength, either alone or as part of a larger structure. They can be processed further to other textile structures, like spun to yarns or woven or knitted or laid in some other methods (such as spunbonding) to two or three-dimensional structures, or they can be used as reinforcements in components, for example in a polymer matrix. The two- or three-dimensional structures can also be used as reinforcements in some applications. If the other constituent included in these threads or filaments is a polymer, it can form a polymer matrix or part of it in the final composite product and the NFC can constitute the reinforcement. Such elongated composite threads or filaments, or yarns or 2- or 3-dimensional structures processed form the composite threads or filaments, can be used either alone or together with additional polymer in manufacturing the final product. The threads or filaments can be post drawn as known for other materials in the fiber-spinning processes to allow further alignment of the constituent NFC nanofibrils. By drawing, known also as "stretching", the threads or the filaments can be straightened and their strength can be increased further.

If the physical entity is a wider film, it can be treated analogously to the threads or filaments, and it can be used as a constructional part in the final application. As the threads or filaments, the film can be provided with other constituents analogously. These other constituents can serve as matrix in the final product, i.e. the film can be a composite film containing polymer which forms polymer matrix or part of it in the final composite product.

According to another embodiment, the threads or filaments formed are not used as constructional parts but they are comminuted, either already in the extraction agent volume or after drying, to smaller particles which can be starting material for another manufacturing process. In this case the constituent mixed or incorporated with the NFC may be a polymer which will form the matrix when the particles are used as masterbatch in preparation of a composite product by melt processing, for example by extrusion, as well as in solvent processing. An additional amount of matrix polymer, which can be the same polymer as in the NFC or a different polymer compatible with it, can be incorporated in the melt processing or solvent processing to the composite product. The threads or filaments are not necessarily the precursors of these particles because they can be formed of physical entities of another shape introduced into the extraction agent volume.

According to another embodiment, the extraction agent exchange process is used to load NFC threads or filaments or comminuted NFC particles with hydrophobic or hydrophilic molecules. The loaded molecules are encapsulated into the nanoporous NFC network and the release profile of these molecules can be adjusted by altering the alignment of the microfibrils and the porosity of the NFC matrix.

According to another embodiment, two- or three-dimensional fiber product is formed in situ in the extraction agent volume by supplying the elongated fiber-like structure from a nozzle, which is operated so that the filament is deposited in the extraction agent according to a 2D or 3D predetermined patterns. There can be several nozzles operating at the same time. Various fiber mats, nonwovens and 3D scaffolds can be created by this process.

BRIEF DESCRIPTION OF THE DRAWINGS

The invention will be explained in the following with reference to the enclosed drawings, where

FIG. 3a illustrates the preparation of macroscopic NFC fibers based on cellulose nanofibril hydrogels. The inset shows a photograph of a real extrusion process of a dye-stained dispersion, FIG. 3b SFM characterization of individual cellulose nanofibrils. The inset shows the height profile of the red section.

DETAILED DESCRIPTION OF THE INVENTION

In this context, the term "nanofibrillar cellulose" or "nanofibrillated cellulose" (NFC for short) is used, it being understood that also "microfibrillar cellulose" (MFC) or "nanocellulose" are commonly used terms for the substance to be described in more detail below.

The nanofibrillar cellulose consists of cellulose fibres whose diameter is in the submicron range. It forms a self-assembled hydrogel network even at low concentrations. At very low concentration a viscous fluid is obtained.

These gels of nanofibrillar cellulose are highly shear thinning and thixotrophic in nature.

The nanofibrillar cellulose is prepared normally from cellulose raw material of plant origin. The raw material can be based on any plant material that contains cellulose. The raw material can also be derived from certain bacterial fermentation processes. Plant material may be wood. Wood can be from softwood tree such as spruce, pine, fir, larch, douglas-fir or hemlock, or from hardwood tree such as birch, aspen, poplar, alder, eucalyptus or acacia, or from a mixture of softwoods and hardwoods. Non-wood material can be from agricultural residues, grasses or other plant substances such as straw, leaves, bark, seeds, hulls, flowers, vegetables or fruits from cotton, corn, wheat, oat, rye, barley, rice, flax, hemp, manila hemp, sisal hemp, jute, ramie, kenaf, bagasse, bamboo or reed. The cellulose raw material could be also derived from cellulose-producing micro-organisms. The micro-organisms can be of the genus *Acetobacter, Agrobacterium, Rhizobium, Pseudomonas* or *Alcaligenes*, preferably of the genus *Acetobacter* and more preferably of the species *Acetobacter xylinum* or *Acetobacter pasteurianus*.

The term "nanofibrillar cellulose" refers to a collection of isolated cellulose microfibrils or microfibril bundles derived from cellulose raw material. Microfibrils have typically high aspect ratio: the length might exceed one micrometer while the number-average diameter is typically below 200 nm. The diameter of microfibril bundles can also be larger but generally less than 1 µm. The smallest microfibrils are similar to so called elementary fibrils, which are typically 2-12 nm in diameter. The dimensions of the fibrils or fibril bundles are dependent on raw material and disintegration method. The nanofibrillar cellulose may also contain some hemicelluloses; the amount is dependent on the plant source. Mechanical disintegration of microfibrillar cellulose from cellulose raw material, cellulose pulp, or refined pulp is carried out with suitable equipment such as a refiner, grinder, homogenizer, colloider, friction grinder, ultrasound sonicator, fluidizer such as microfluidizer, macrofluidizer or fluidizer-type homogenizer. In this case the nanofibrillar cellulose is obtained through disintegration of plant cellulose material and can be called "nanofibrillated cellulose".

"Nanofibrillar cellulose" can also be directly isolated from certain fermentation processes. The cellulose-producing micro-organism of the present invention may be of the genus *Acetobacter, Agrobacterium, Rhizobium, Pseudomonas* or *Alcaligenes*, preferably of the genus *Acetobacter* and more preferably of the species *Acetobacter xylinum* or *Acetobacter pasteurianus*.

"Nanofibrillar cellulose" can also be any chemically or physically modified derivate of cellulose nanofibrils or nanofibril bundles. The chemical modification could be based for example on carboxymethylation, oxidation, esterification, or etherification reaction of cellulose molecules. Modification could also be realized by physical adsorption of anionic, cationic, or non-ionic substances or any combination of these on cellulose surface. The described modification can be carried out before, after, or during the production of microfibrillar cellulose.

The nanofibrillated cellulose is according to one embodiment non-parenchymal cellulose. The non-parenchymal nanofibrillated cellulose may be in this case cellulose produced directly by micro-organisms in a fermentation process or cellulose originating in non-parenchymal plant tissue, such as tissue composed of cells with thick, secondary cell wall. Fibres are one example of such tissue.

The nanofibrillated cellulose can be made of cellulose which is chemically premodified to make it more labile. The starting material of this kind of nanofibrillated cellulose is labile cellulose pulp or cellulose raw material, which results from certain modifications of cellulose raw material or cellulose pulp. For example N-oxyl mediated oxidation (e.g. 2,2,6,6-tetramethyl-1-piperidine N-oxide) leads to very labile cellulose material, which is easy to disintegrate to microfibrillar cellulose. For example patent applications WO 09/084566 and JP 2007340371 disclose such modifications.

A specific form of nanofibrillated cellulose consists of rod-like fibrils that are obtained by strong acid hydrolysis.

The nanofibrillated cellulose is preferably made of plant material. One alternative is to obtain the nanofibrils form non-parenchymal plant material where the nanofibrils are obtained from secondary cell walls. One abundant source of cellulose nanofibrils is wood fibres. The nanofibrillated cellulose is manufactured by homogenizing wood-derived fibrous raw material, which may be chemical pulp. When NFC where the cellulose is modified cellulose is manufactured from wood fibres, the cellulose can be labilized by oxidation before the disintegration to nanofibrils. The disintegration in some of the above-mentioned equipments produces nanofibrils which have the diameter of only some nanometers, which is 50 nm at the most and gives a clear dispersion in water. The nanofibrils can be reduced to size where the diameter of most of the fibrils is in the range of only 1-20 nm only.

Particularly preferred cellulose material to be used in the invention is cellulose derivative, where cellulose molecules in MFC contain some additional functional groups compared with the chemical structure of native cellulose. Such groups can be carboxymethyl, aldehyde and/or carboxyl or quaternary ammonium. This kind of MFC samples are obtained e.g. by fibrillation of carboxymethylated, oxidated (N-oxyl mediated), or cationized cellulose pulp, respectively. The modification can be performed also after fibrillation. When a gel consisting of any of these modified MFC grades is introduced in the extraction agent, the gel remains more easily coherent than with a native cellulose based gel.

Other substances can be used in the invention by adding them at a suitable process step to the nanofibrillated cellulose. The method of adding depends on the nature of the substance. If the substance is water soluble or hydrophilic, it is added in the NFC hydrogel before the hydrogel is brought into contact with the extraction agent. If the substance is non-water soluble or hydrophobic but soluble in extraction agent, it is added in the extraction agent from where it can enter the NFC hydrogel.

The aforementioned substances include hydrophilic polymers which are added to the NFC hydrogel and hydrophobic polymers which are added to the extraction agent. Amphiphilic copolymers are a special group of polymers which can be added either to the NFC hydrogel or to the extraction agent, depending on which copolymer moiety is used for the hydrophobic/hydrophilic interaction with the extraction agent or with the water of the hydrogel.

Some non-limiting examples of hydrophilic polymers that can be added to the hydrogel so that they will be contained in the fibrous products are chitosan and hydroxyethylcellulose.

If amphiphilic copolymers are used, they are used preferably in form of micelles assembled from individual copolymer molecules. The hydrophobicity or hydrophilicity is determined by the shell-forming moiety of the copolymer. These micelles can be used for encapsulating another substance, for example a drug.

However, in principle any substances having either water-soluble molecules or non-water soluble molecules can be used, provided that they are compatible with the NFC and other substances used. The invention is not limited exclusively to the use of polymers.

One special group of materials that can be included in the fibrous products is active compounds which provide the product with functionality of some kind. The active compound can be added either to the NFC hydrogel or to the extraction agent, depending on their characteristics.

For a particular application in medical field, the additional material can be an active compound or mixture of compounds which has pharmaceutical or biological activity, for example a drug, an extra cellular matrix component, serum, growth factor or protein. This makes it possible to use the product as fibrous 1-, 2- or 3-dimensional structure which will release the agent when placed in contact with a human body in external or internal use, for example for structures to be placed on skin or to be implanted subcutaneously. The aforementioned products could be utilized also in vitro cell culture applications.

The substance added may be comprise reactive molecules which will be chemically altered during the formation process of the NFC product. The substance can for example be polymer precursors such as monomers or oligomers which are polymerized in the NFC. The reactive molecules can be added in the NFC hydrogel or in the extraction agent.

Furthermore, the material to be added in the hydrogel can be in particle form. If the hydrogel is to be introduced to the extraction agent through orifices, the particle size must be sufficiently small not to clog the orifices.

If the material is added to the extraction agent it will penetrate the physical entities of NFC which are being formed in the volume of the extraction agent. If one or more subsequent volumes of extraction agents are used after the first volume, the material can be added to such a subsequent volume from where it can be penetrate the physical entities.

The dried NFC product can be aftertreated, for example fibrous materials can be surface-modified to increase their resistance to environmental factors, such as moisture. The dried NFC product can also be impregnated with a substance, since it contains porosity. Impregnation can be done for example by dipping the product in a solution where the substance is dissolved and drying. For example polymers can be introduced in this step in a solvent, or polymer precursors such as monomers or oligomers can be introduced and the polymerization can be conducted within the product.

Figure 1A:
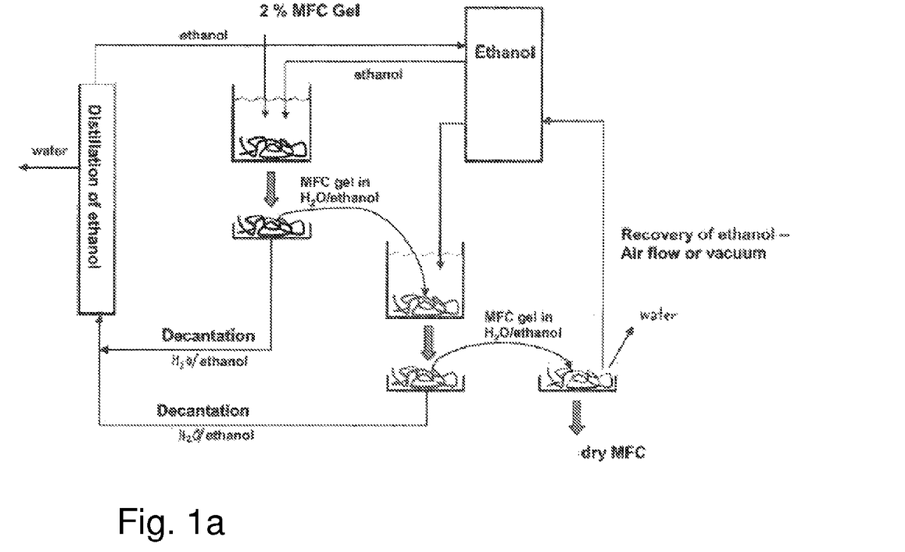
FIGS. 1a and 1b are schemes of a process where the method according to the invention is employed.

FIG. 1a shows the basic principle of a process that can be applied in industrial scale. Aqueous NFC gel, hydrogel, is introduced into a volume of organic extraction agent. The organic extraction agent used is miscible with water. The extraction agent can also be a mixture of chemically different extraction agents. In the volume, the water in the hydrogel is completely or partly exchanged with the extraction agent, that is, the water is extracted out of the gel and it is gradually replaced with the extraction agent. The exchange does not necessarily proceed to completion because of the equilibrium conditions, but, as a rule, the major part of the water which would make the drying difficult is extracted in this step. Thus, the volume of the extraction agent can be called an "extraction bath" for the NFC gel.

In industrial scale, the NFC gel is introduced into the extraction bath through a suitable port that allows the formation of discrete physical entities whose shape is determined by the port and the rate of introduction of the gel. The port may comprise several orifices through which the NFC hydrogel is extruded. The hydrogel can be introduced for example through an extruder with a suitable breaker plate that generates numerous elongate entities, hydrogel "worms" or ribbons, in general thread-like elongate objects in the extraction bath. Alternatively, a spray nozzle could be used if the aim is to obtain small spheres or beads, in which case the hydrogel is introduced at short intervals, "dropwise", rather than as continuous strand. A port introducing the hydrogel in this way can comprise several spray nozzles in parallel from which the hydrogel issues as drops.

It is also possible to introduce the hydrogel on larger blocks into the extraction agent volume without any specific port. In this case the blocks of hydrogel are crumbled mechanically in the extraction agent to smaller pieces, for example using the agitator blades, to enable the extraction agent exchange to start. This alternative is used if the purpose is to make NFC raw material for subsequent processes.

The concentration of the NFC fibrils in the gel is preferably but not limited to 0.5-5%, based on the total weight of the gel.

The extraction agent exchange process comprises preferably two or more steps. After the gel has been introduced into the extraction agent volume and the change of water with the extraction agent proceeds to a certain equilibrium state which depends on the relative amounts of the gel and extraction agent. Thereafter the physical entities are separated from the extraction agent volume and put into another volume of extraction agent to extract residual water from the entities if the water content is needed to be further lowered. The second extraction agent volume can consist of different organic liquid than the first extraction agent volume. The physical entities are, because of their size, easily separable form each extraction agent volume by decantation or any other separation technique, for example by filtering using a fine mesh.

The non-water soluble molecule, e.g. polymer or monomer or oligomer or active compound which is to be incorporated to the NFC entities formed through the extraction agent is added to the second extraction agent volume, if such step exists, or to the first volume only, or both to the first volume and second volume of extraction agent.

The extraction agent volumes which contain the extracted water of the hydrogel are regenerated by distillation, where water is separated, and the regenerated extraction agent can be recirculated back to the extraction agent exchange process.

After the extraction agent exchange process the physical entities are dried by allowing the extraction agent to evaporate from the entities. The physical entities may contain still some residual water, which evaporates easily without interfering with the drying process. The drying is preferably performed at elevated temperature or lower temperature by evaporation and/or vacuum (reduced pressure). The organic extraction agent released from the entities is collected, condensed and recirculated back to the extraction agent exchange process. During the drying the entities shrink from their original dimensions.

Figure 1B:
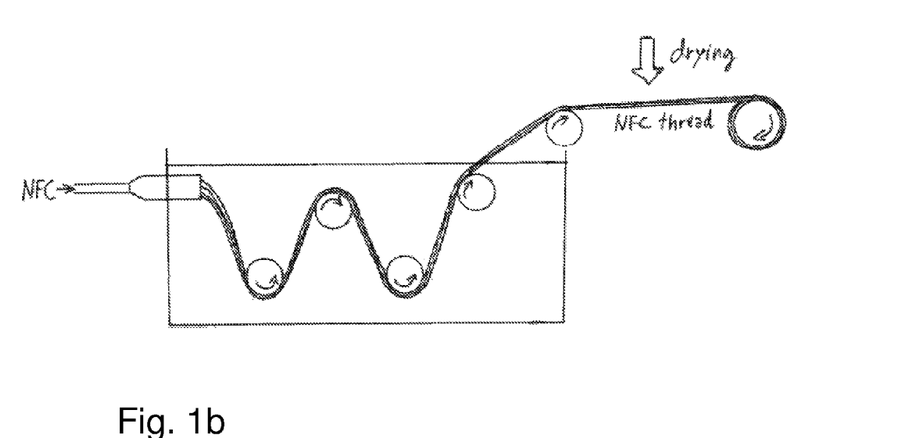

FIG. 1b shows schematically a process where continuous threads or filaments can be produced. The NFC hydrogel is extruded through several orifices to the volume of organic extracting agent where it is allowed to undergo the solvent exchange process during a predetermined residence time. Rollers can be used to guide the threads or filaments inside the volume of extracting agent so that the residence time is accomplished. The threads or filaments that are drawn out of the volume are dried in hot gas flow to evaporate the extraction agent and residual water and collected subsequently on a reel. In this process the threads can also be drawn when wet in a predetermined draw ratio (stretching), which increases the tensile strength. The volume of the extracting agent can contain a substance that is to be incorporated in the filaments or threads and/or the NFC hydrogel may contain a substance for the same purpose. Alternatively, a substance can be incorporated in the filaments or threads after drying. These substances were mentioned above and will also be discussed later in more detail.

The organic extraction agent can be also removed by pressing the elongated thread-like NFC gel entities between two rolling cylinders that compress the wet fiber to ribbon-like filament. This can be done in the process of FIG. 1b or in any other process where elongate thread-like NFC gel entities are produced. The mechanical pressing can precede the final drying stage.

After drying the physical entities, comprising the NFC and any substances incorporated in it through the hydrogel and/or an extraction agent volume, can be comminuted by a suitable mechanical process to a final particle size. This can be done to fiber-like structures as well, if they are not to be used as such in subsequent constructions.

Figure 2:
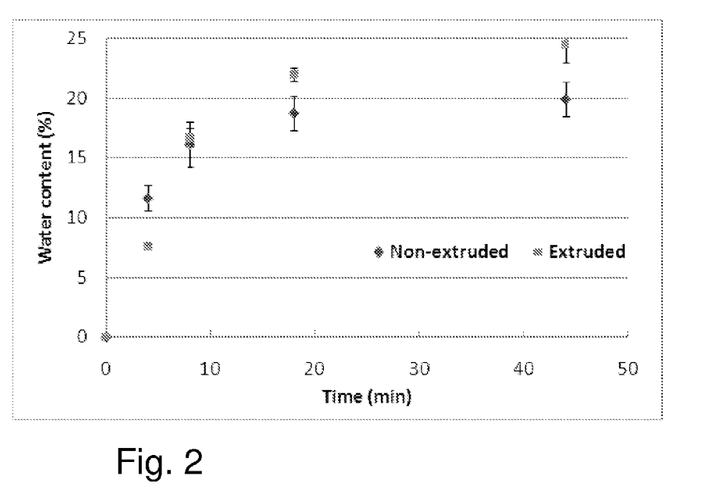
FIG. 2 is a graph showing water content of ethanol in course of extrusion of NFC in accordance with the invention.

FIG. 2 is an exemplary graph which shows how the water content of ethanol (the extraction agent) increases in course of the extrusion of an aqueous N-oxyl-mediated oxidated NFC gel into an ethanol bath, in proportion of one part gel/four parts ethanol (vol/vol). Both "crumb" (adding the hydrogel in blocks which were crumbled mechanically) and extrusion methods were used (marked "Non-extruded" and "Extruded"). The solvent volume was stirred in both cases during the introduction. The exchange of water and ethanol is driven by a concentration gradient such that concentration equilibrium is reached in both the NFC gel matrix and the solvent medium. At this point the amount of water in the ethanol bath should equal the amount of water within the gel. The water content of the ethanol bath at different times was determined with Karl Fischer titration of samples taken at different times. The figure shows how the mixture reaches the equilibrium plateau already after 20 minutes and the majority of water has diffused out of the gel entities. The figure also shows how the solvent exchange begins immediately after the aqueous gel is exposed to the solvent and the solvent exchange proceeds quickly during the 10 first minutes.

The detailed fiber preparation is first illustrated using NFC material prepared via TEMPO-mediated oxidation of wood pulp and subsequent homogenization in a microfluidizer, yielding high-aspect ratio nanofibrils with diameters down to a few nanometer and length up to several micrometers. These nanofibers form strong hydrogels in water. Scanning force microscopy (SFM) in FIG. 3b shows individual NFC nanofibrils, where the section analysis reveals heights in the range of 1-2 nm.

Figure 3:
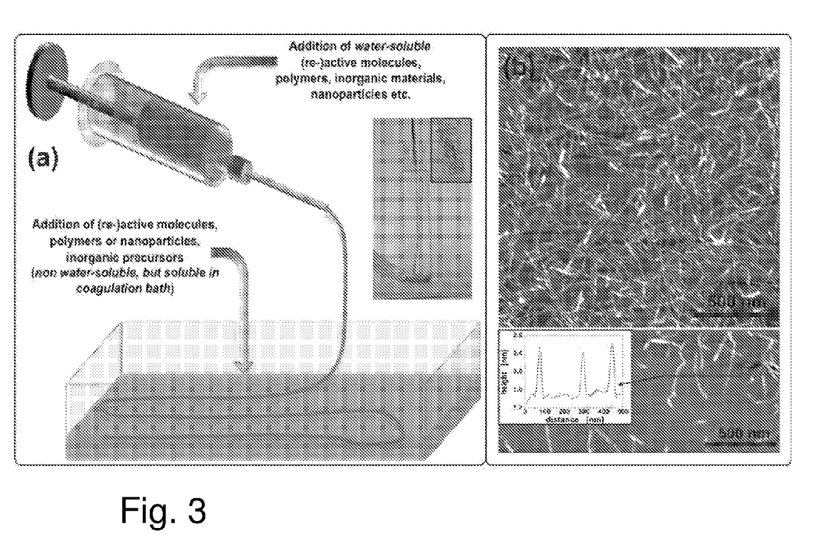

The generation of macroscopic NFC fibers can be accomplished via simple wet extrusion of the hydrogels (c≈1 wt %) into the coagulation bath containing an organic water soluble extraction agent (e.g. ethanol, dioxane, isopropanol, THF or the like, FIG. 3a). A dye-labeled NFC dispersion clearly visualizes the formation of intact NFC threads in the photograph. The coagulation bath induces almost instantaneously a skin formation on the outside of the extruded NFC hydrogel dispersion, imparting the fibers with a sufficient mechanical stability. The resulting NFC fibers within the coagulation bath are stabilized against inter-fiber aggregation and can be easily manipulated. Further on, essentially complete extraction agent exchange can be accomplished, if desired, via diffusion inside the coagulation bath. Afterwards the fibers are simply dried in air or at higher temperature. A complete extraction agent exchange is not necessary to create stable fibers during drying. Similar fiber structures were obtained from carboxymethylated MFC and cationized MFC.

Figure 4:
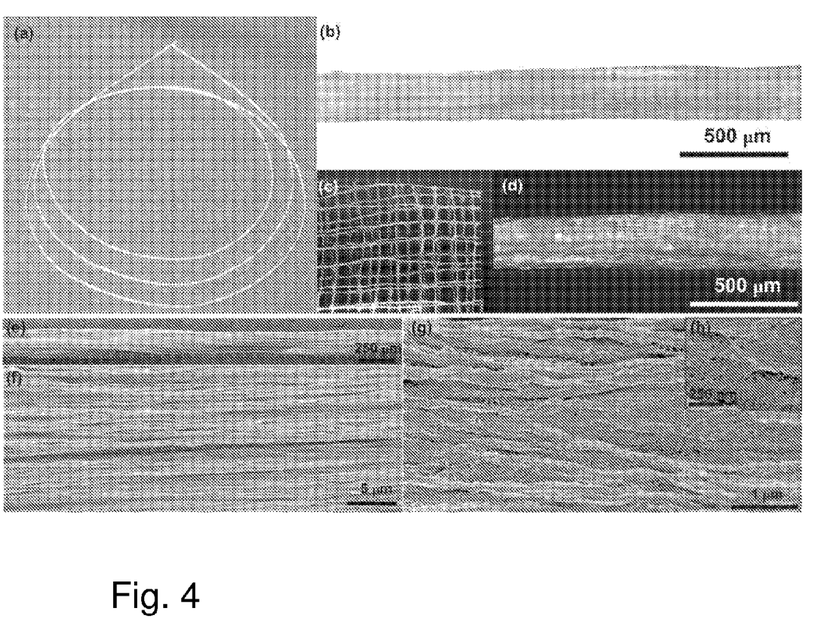
FIG. 4a is a photograph of a 1 m long NFC fiber.
FIG. 4b is its optical micrograph without crossed polarizers.
FIG. 4d is its optical micrograph with crossed polarizers.
FIG. 4c shows a non-woven fiber mat prepared via consecutive extrusion.
FIGS. 4e-4h are SEM images from the micro- to the nanoscale.

Wet extrusion easily allows the preparation of long fibers, and non-wovens or fiber mats are accessible via geometrically controlled extrusion patterns. FIG. 4 displays a 1 m long fiber and a defined, non-woven fiber mat. Arbitrary structures could be created by suitable 2D or 3D printing techniques. The diameter of the resultant fibers can principally be adjusted by the size of the needle or die used for the process. The cross-sectional diameter of the herewith-prepared threads is not perfectly circular and may vary slightly along the thread. These imperfections originate from the non-uniformities (small aggregates etc.) present within the hydrogel of the strongly hydrogen-bonding NFC nanofibrils. The white appearance of the NFC fibers points to a certain porosity and light scattering at internal NFC/air interfaces.

In order to assess the microscopic order of the individual nanofibrils within the macroscopic fibers, we used scanning electron microscopy (SEM) to reveal details down to the nanoscale (FIG. 4e-g). A preferential orientation on the micron-scale can be identified as induced by the extrusion process. However, the individual NFC nanofibers only show a moderate orientation, as similarly indicated by the modest birefringence when observing the thread between crossed polarizers (FIG. 4d&g,h). The shear forces created during the extrusion are obviously insufficient to allow for a complete alignment of such long and entangled nanofibrils. The threads exhibit a nanoporous structure with pores in the size of up to 25 nm, according to the SEM imaging. Comparing the diameter of the resulting fiber with the dimensions of the extrusion needle and the known concentration yields a porosity below 10%. Although porosity may in the first instance not be beneficial for the mechanical properties, it can be turned into an advantage for incorporating functionalities as discussed above.

Figure 5:
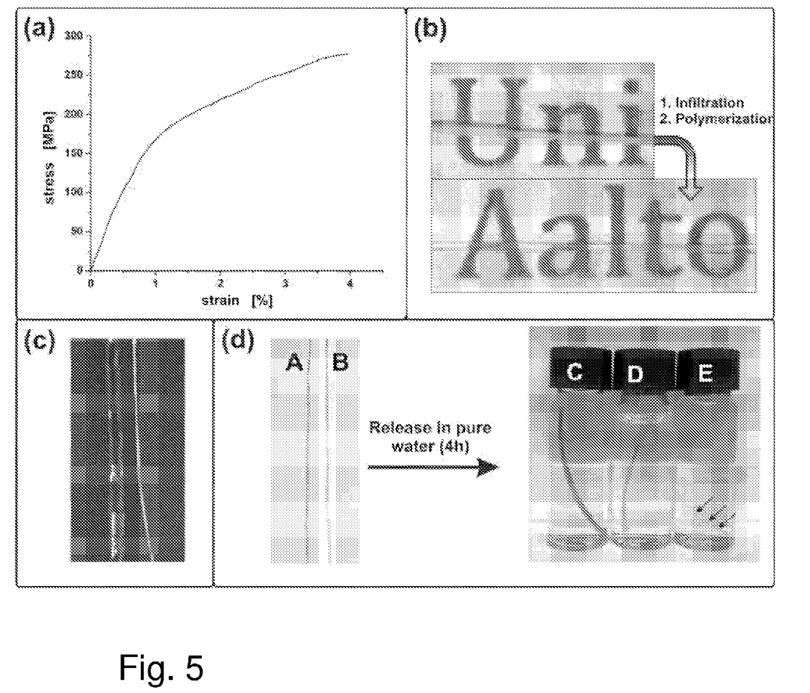
FIGS. 5a to 5d show mechanical properties, optical transparency, wettability control and encapsulation/release of model compounds for NFC fibers.

A stress-strain curve of an individual NFC thread is shown in FIG. 5a. Although the individual NFC nanofibrils do not exhibit a global alignment, the mechanical properties, as obtained by tensile tests, already demonstrate impressive values. Typical values for stiffness and ultimate strength at break are 22.5 GPa and 275 MPa (at 4% strain maximum elongation, FIG. 5a), respectively. These mechanical characteristics are slightly larger than the ones typically obtained for non-infiltrated NFC nanopapers. The orientation of the nanofibrils within the threads, even if not very pronounced, may be responsible for the better performance. The stiffness of the NFC threads is around one third to one fourth of glass fibers and Kevlar 29, respectively, and is twice as high than some of the best spider silk grades. It is also an order of magnitude larger than typical Rayon fibers, which are based on regenerated cellulose.

The area under the stress strain curves allows us to estimate the work of fracture to a high value of 7.9 MJ/m$^3$. Such a mechanical performance, combining stiffness, strength and toughness, is not frequently found, especially among slightly porous materials. These properties render the NFC fibers, prepared with a surprisingly simple room temperature procedure, a most promising source for high-performance and biodegradable fiber-reinforced composite materials.

Beyond excellent mechanical properties, we demonstrate how to equip the NFC threads with attractive multifunctional properties, that may for instance allow the manipulation in external fields, produce optically transparent fiber-reinforced composites, enable damage sensing under stress and controlled release of active compounds. These goals need to be met if we want to approach applications such as actuators, in biomedicine, electronic or optic devices, or for high-performance lightweight (bio)composite materials.

Optical transparency and tailored stability in outdoor environments are prime goals with respect to future biobased composites. FIG. 5b shows how opaque NFC threads can be rendered translucent by infiltration of the NFC fibers with a resin, matching the refractive index of cellulose, and subsequent polymerization. The refractive index of cellulose fibers is 1.62 and 1.54 in the longitudinal and transverse direction, respectively. This matches well to the refractive index of an acrylic resin based on tricyclodecane dimethanol dimethacrylate (RI=1.53). The impregnation replaces interfaces of high-refractive index contrast between NFC nanofibrils and air and henceforth leads to a strong reduction of light scattering, resulting in nearly fully transparent, biobased filaments (FIG. 5b). As a logic consequence, fiber-reinforced plastics based on the same resin and NFC threads will also be highly translucent. Such transparent materials are for instance out of reach for carbon-fiber reinforced materials due to the inherent light adsorption of the carbon fibers.

Secondly, real-life outdoor applications of fibers (fiber reinforced plastics or concrete, textiles etc.) require a control of the long-term stability and enhanced durability. Again, we are able to meet this criteria via simple modifications. A facile gas-phase mediated (chemical vapor) deposition of a perfluorinated trichlorosilane, which is a model compound for typical hydrophobization agents, onto the reactive hydroxy functions of the glucose units leads to a significant change in wettability. FIG. 5c shows NFC fibers after swelling in water for four hours before (left) and after (right) surface modification with a fluorinated silane. The water up-take is drastically reduced, thus minimizing both a mechanical softening as well as the available surface for microbial attacks in humid or even wet environments. Note that this modification also demonstrates the straight-forward conjugation of functional entities, e.g. for sensing or recognition, to the large amount of hydroxyl groups present on the cellulose surface.

Incorporation of functional compounds is however not restricted to chemical binding. FIG. 3a already sketches some of the possible pathways of how to include active molecules (such as drugs or antibiotic agents), polymers for composite fibers or inorganic materials (carbon nanotubes, inorganic nanoparticles) into the NFC threads. FIG. 5d demonstrates results for incorporating hydrophilic and hydrophobic model compounds (i.e. dyes) into the NFC threads via physical entrapment. It shows NFC threads loaded with hydrophobic nile red (A) and hydrophilic rhodamine 6G (B). Different release characteristics for hydrophobic nile red (C), cationic rhodamine 6G (D) and anionic sulforhodamine (E) are shown. The arrows indicate the swollen NFC thread in (E). If the desired materials (e.g. rhodamine derivatives) are water-soluble, they can simply be premixed into the NFC hydrogel and co-extruded into the fiber. Depending on the interaction with the slightly anionic NFC, the dopants remain tightly entrapped within the NFC thread. Since only very short ageing times are necessary to obtain sufficient mechanical stability for drying, excessive release of entrapped material can be prevented on this timescale. Hence, the encapsulation is near quantitative. On the other hand, hydrophobic compounds can preferentially be infused into the NFC fibers via prolonged extraction agent exposure and full exchange in the coagulation bath. The final concentration is obviously limited to the concentration of the compound in the coagulation bath if no attractive interactions between NFC and the compound exist. Herein, the hydrophobic dye nile red serves as an example. Both fibers with encapsulated hydrophilic and hydrophobic model compounds are strongly colored, confirming the presence of significant quantities of materials.

Due to the large versatility with respect to the polarity of the dopants, it is possible to virtually encapsulate any kind of compound into the fibers. The complete preparation process can thus be considered a platform technology for robust, functional and payload-containing biofibers. Interestingly, depending on the interaction of the entrapped compounds with the NFC nanofibril (steric, ionic and hydrogen bonding), different release profiles can be achieved. A strong difference between the different net charges of the rhodamine derivatives can be observed. Whereas the anionically charged sulforhodamine diffuses out of the fiber, the cationic Rhodamine 6G resides nicely entrapped within the NFC threads. This behavior originates from the tighter electrostatic binding of Rhodamine 6G with the slightly anionic NFC. Similarly, the hydrophobic compound, infused via the extraction agent bath, remains essentially within the NFC thread in the observed time frame (FIG. 5d). We expect that the release kinetics can be widely tuned by tailoring the charge and hydrogen-bonding interaction, embedding the active compounds into coextruded drug carriers (liposome or micelles) or attaching them to polymers or even directly onto the nanofibrils.

Figure 6:
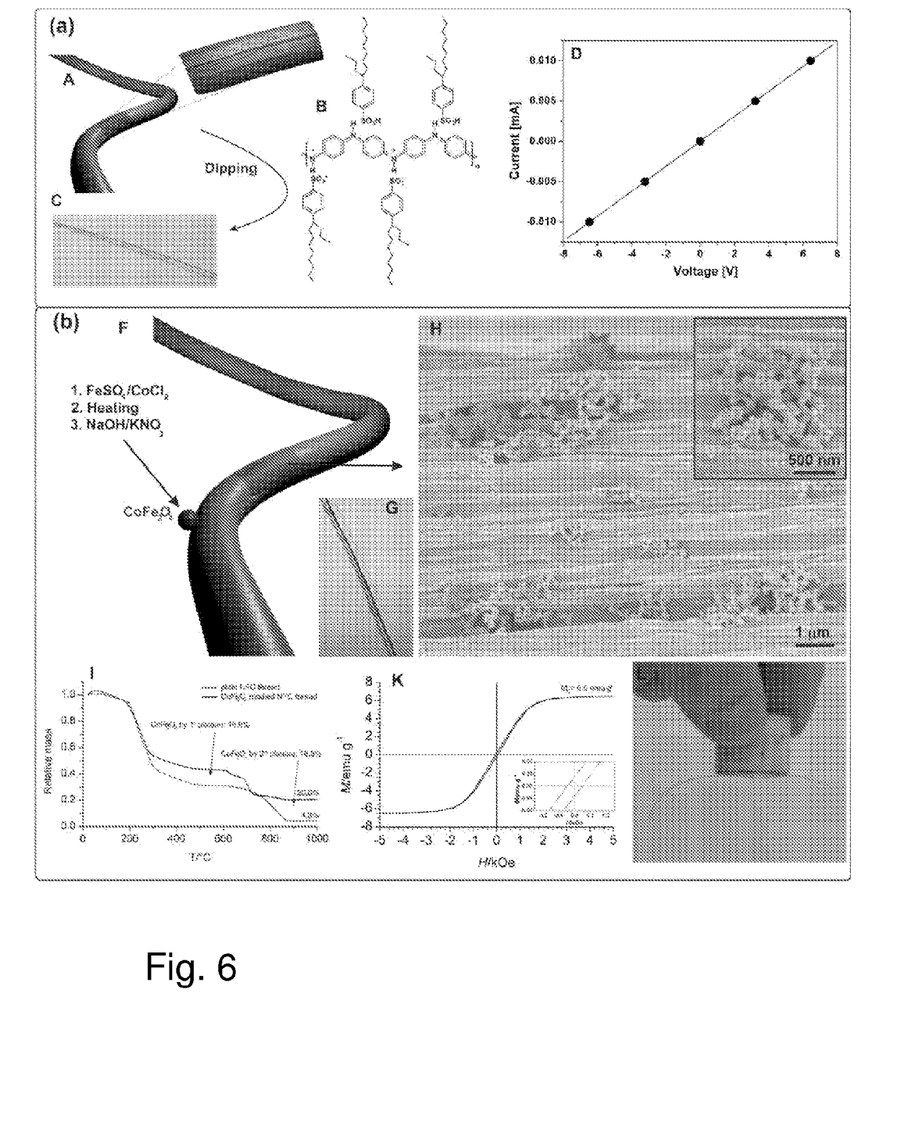
FIGS. 6a and 6b show some advanced functionalities of NFC fibers, such as electric conductivity (FIG. 6a) and magnetism (FIG. 6b).

Electric conductivity can be achieved by impregnating the dried fibers in a toluene solution containing doped polyaniline (PANI). PANI is one of few commercially available conducting polymers. The undoped emeraldine base form of PANI can be rendered electrically conducting via complexation with strong acids, leading to an emeraldine salt. To achieve sufficient solubility, suitable plasticizing organic acids, such as dodecyl benzene sulfonic acid (DBSA), are used. Herein, we use a mixture with an excess of the doping acid. The impregnation can be accomplished via simple dipping of the NFC filaments into a solution of PANI (DBSA)$_{1.1}$ (FIG. 6a). Due to the high surface energy and the beneficial porosity, the conducting polymer tightly adsorbs onto and into the fibers. Rinsing with copious amounts of toluene to remove any unbound polymer results in a slightly green NFC fiber, where the color originates from the remaining adsorbed PANI(DBSA)$_{1.1}$. Elemental analysis of the nitrogen content reveals a total content of adsorbed PANI (DBSA)$_{1.1}$ of around 13.1 wt %. The final NFC filaments exhibit a conductivity as high as $1.9 \cdot 10^{-3}$ S/cm. This value is remarkably high considering the only small weight fraction of adsorbed material. FIG. 6aD shows the linear current-voltage curve demonstrating the ohmic behavior of the conducting PANI-modified NFC fibers. This current voltage diagram reveals an ohmic behavior, demonstrating a structurally intact conducting pathway along the fibers.

This immobilization process is not restricted to a post impregnation of dried fibers, but could already be realized by using a PANI(DBSA)$_{1.1}$ doped extraction agent bath. This simple in-situ functionalization into conducting biofibers can find widespread interest and is of direct relevance for applications in (bio)electronics, sensing and for the damage monitoring of fiber-reinforced composite materials.

In the last section, we will demonstrate NFC threads that are susceptible to actuation in external fields. For this purpose, we prepared inorganic/organic hybrid fibers with ferromagnetic cobalt ferrite nanoparticles attached to the threads. The $CoFe_2O_4$ particles are synthesized via a simple aqueous coprecipitation reaction of $FeSO_4$ and $CoCl_2$ (FIG. 6bF) in the presence of an already prepared NFC thread. During this process, the $CoFe_2O_4$ particles easily attach to the NFC thread and remain tightly trapped after drying, resulting in a dark brown fiber (FIG. 6bG). The SEM images reveal clustered magnetic nanoparticles with a size distribution centered at diameters of 50-90 nm, whose weight fraction can be estimated to 16.7 wt % according to thermogravimetric analysis (FIG. 6bH,I). Interestingly, the second and third degradation steps of pure NFC at 600-720° C. are shifted to around 800° C., indicating a close interaction between both components. The magnetization loop curve, as determined by a SQUID magnetometer at 300° C., reveals a saturation moment of the modified fiber of 6.5 emu/g (FIG. 6bK). Compared to the saturation moment of bulk $CoFe_2O_4$ (80 emu/g) yields the mass concentration of magnetically active $CoFe_2O_4$ to be 8.1 wt %. The difference in comparison to the value obtained by TGA can be explained by surface effects on nanoparticles and incomplete crystallization of the ferrite, which are known to decrease the saturation magnetization.

The resulting hybrid filaments can be easily manipulated with a weak fingertip-sized household magnet (FIG. 6bL). Due to the small coercivity, the threads can be classified as soft magnets. Therefore, we envisage applications in magnetically-actuable biocomposites and fiber materials as well as for components in intelligent textiles, for magnetic shielding and in microwave technology.

The process can be modified from the above-described process within the scope of the invention. There can be only one extraction agent-exchange step where water within the gel is exchanged with the extraction agent, or the number of steps can be two or more. Further, instead of forming continuous elongated threads or ribbons from the gel in the extraction agent-exchange process, the physical entities formed of the gel when it is introduced in the extraction agent volume can take the shape of flakes, beads, etc., depending on the method of supply, for example introduction rate combined with the port structure (orifices), through which the hydrogel issues and which determines the shape of the physical entities. The physical entities formed of the gel in the extraction agent volume should be easily separable form the volume by simple methods such as decantation, lifting, skimming, sedimentation, filtering through a fine mesh etc.

The port can be immersed in the volume of organic extraction agent, in which case the hydrogel comes in contact with the organic extraction agent immediately after it has issued from the port, or it can be separated from the volume, in which case the hydrogel enters air for a short while before coming in contact with the organic extraction agent.

As was explained in more detail earlier, the hydrogel serving as the raw material can, besides NFC and water and the substances mentioned hereinabove, also contain other substances, which can be dissolved or dispersed in the gel. It is also possible that the NFC contained in the gel and consequently in the fiber product or composite may be a blend of various chemically different NFC grades.

The organic extraction agent used in the extraction agent volumes of two or more subsequent extraction agent-exchange steps need not necessarily be the same extraction agent chemically, provided that all extraction agents used are miscible with water. However, in view of the simplicity of the process and recovery and recycling of the extraction agent, the same extraction agent is preferred in all steps.

The dried NFC product can be in fibrous form in a 1-dimensional structure (thread or filament) or 2- or 3-dimensional structure (threads or filaments laid together, possibly interlocked mechanically using known textile bonds or deposited as non-woven webs).

The dried product can also exist also as film, in which case its manufacturing stages includes introducing the NFC hydrogel through a narrow slit-like orifice into the extraction agent bath where the exchange of solvents and subsequent drying stages occur analogously with fibrous products, possible additional constituents being added already in the hydrogel, through an extraction agent bath, or in a post-treatment.

The invention claimed is:

1. Method for fabricating fiber products, film products, or composites,
    comprising:
        introducing an aqueous gel of nanofibrillar cellulose into a volume of organic extraction agent miscible with water so that the aqueous gel is kept as a separate phase and forms one or several discrete physical entities containing the nanofibrillar cellulose within the phase and so that the aqueous gel does not become dispersed in the organic extraction agent,
        changing water with the organic extraction agent in the one or several discrete physical entities of nanofibrillar cellulose, and
        drying the nanofibrillar cellulose by removing the organic extraction agent from the one or several discrete physical entities of nanofibrillar cellulose;
    the method further comprising:
        introducing the aqueous gel of nanofibrillar cellulose into the volume of organic extraction agent in the form of one or several elongated elements that form a fiber-shape or ribbon-shape or film-shape product after drying, and/or
        incorporating at least one substance into the one or several discrete physical entities through the aqueous gel and/or through the extraction agent to make a composite of nanofibrillar cellulose and the substance, wherein
            the at least one substance is selected from the group consisting of a polymer, either as such or in the form of precursors, an active drug molecule, an extra cellular matrix component, serum, a growth factor, and a protein.

2. Method according to claim 1, wherein the one or several discrete physical entities are one or several elongated elements which form the fiber-shape, ribbon-shape or film-shape product.

3. Method according to claim 2, wherein the strength of the one or several elongated elements is increased by stretching.

4. Method according to claim 3, wherein the fiber-shape or ribbon-shape product is processed further to yarn.

5. Method according to claim 3, wherein the fiber-shape or ribbon-shape product is processed further to a 2- or 3-dimensional structure.

6. Method according to claim 3, wherein the fiber-shape or ribbon-shape product, or yarn or a 2- or 3-dimensional structure processed from it, is incorporated in a composite as reinforcement.

7. Method according to claim 3, wherein the film-shape product is incorporated in a composite as reinforcement.

8. Method according to claim 2, wherein the fiber-shape or ribbon-shape product is processed further to yarn.

9. Method according to claim 2, wherein the fiber-shape or ribbon-shape product is processed further to a 2- or 3-dimensional structure.

10. Method according to claim 2, wherein the fiber-shape or ribbon-shape product, or yarn or a 2- or 3-dimensional structure processed from it, is incorporated in a composite as reinforcement.

11. Method according to claim 10, wherein the substance incorporated in the one or several physical entities is a polymer either as such or in the form of precursors and the polymer forms polymer matrix or part of it in the composite.

12. Method according to claim 11, wherein the polymer is a hydrophobic polymer which is dissolved in the extraction agent volume and enters the physical entities from the extraction agent volume.

13. Method according to claim 11, wherein the polymer is a hydrophilic polymer which is dissolved in the aqueous gel of nanofibrillar cellulose and is incorporated in the physical entities when the aqueous gel is introduced into the extraction agent volume.

14. Method according to claim 2, wherein the film-shape product is incorporated in a composite as reinforcement.

15. Method according to claim 2, wherein 2- or 3-dimensional fiber structures are formed by depositing the elongated elements in situ in the volume of organic extraction agent to 2- or 3-dimensional structures.

16. Method according to claim 1, wherein the polymer is a hydrophobic polymer which is dissolved in the extraction agent volume and enters the physical entities from the extraction agent volume.

17. Method according to claim 1, wherein the polymer is a hydrophilic polymer which is dissolved in the aqueous gel of nanofibrillar cellulose and is incorporated in the physical entities when the aqueous gel is introduced into the extraction agent volume.

18. Method according to claim 1, wherein the several physical entities are made to particles containing the nanofibrillar cellulose and the incorporated substance.

19. Method according to claim 18, wherein the incorporated substance is a polymer either as such or in the form of precursors.

20. Method according to claim 19, wherein the particles are used as at least one starting material in melt-processing or solvent processing and an article containing the polymer and the nanofibrillar cellulose is manufactured by the melt processing or solvent processing.

21. Method according to claim 20, wherein the melt processing is extrusion molding.

22. Method according to claim 1, wherein the organic extraction agent is selected from a water-miscible alcohol, dioxane and THF.

23. Method according to claim 1, wherein the nanofibrillar cellulose is functionalized cellulose.

24. Method according to claim 23, wherein the nanofibrillar cellulose contains aldehyde, carboxyl, carboxymethyl or cationic groups in the cellulose molecules.

25. Method according to claim 1 comprising:
making the fiber product in the form of an elongated continuous filament or thread, which contains rearranged nanocellulose fibrils giving structural integrity and stiffness to the fiber product,
wherein a tensile modulus of the fiber product is at least 20 GPa, making a 2- or 3-dimensional structure from the fiber product, and incorporating the fiber product as a reinforcement in composites, or
including a functional substance in the fiber product so that the fiber product acts as a carrier material for functional substances.

26. Method according to claim 25, wherein the functional substance is an electrically conducting substance.

27. Method according to claim 26, wherein the electrically conducting substance is a conducting polymer.

28. Method according to claim 25, wherein a tensile strength of the fiber product is at least 250 Mpa.

29. Method according to claim 25, wherein the nanocellulose fibrils are rearranged by at least partial orientation.

* * * * *